United States Patent [19]
Prem et al.

[11] Patent Number: 6,086,076
[45] Date of Patent: Jul. 11, 2000

[54] LARGE DUMP TRUCK SUSPENSION

[75] Inventors: Hans Prem, Mulgrave, Australia; Francis Allen Bartley, Quapaw, Okla.; Darin Ross Miller, Joplin, Mo.; Alan William Dickerson, Mt Eliza, Australia

[73] Assignee: BHP Coal Pty Ltd., Australia

[21] Appl. No.: 08/836,322

[22] PCT Filed: Mar. 29, 1996

[86] PCT No.: PCT/AU96/00180

§ 371 Date: Jul. 11, 1997

§ 102(e) Date: Jul. 11, 1997

[87] PCT Pub. No.: WO96/30223

PCT Pub. Date: Oct. 3, 1996

Related U.S. Application Data

[63] Continuation of application No. 08/414,619, Mar. 31, 1995, abandoned.

[51] Int. Cl.[7] .............................. B60G 9/02; B62D 61/00
[52] U.S. Cl. .......................... 280/124.111; 280/124.116; 180/24.07; 180/348; 298/22 R
[58] Field of Search .................... 280/124.111, 124.116, 280/124.11, 124.112, 124.156, 788; 180/24.07, 60, 62, 348, 349; 298/22 R

[56] References Cited

U.S. PATENT DOCUMENTS

| | | | |
|---|---|---|---|
| 2,862,724 | 12/1958 | Stover | 280/124.116 |
| 3,552,798 | 1/1971 | Cole et al. | 298/22 R |
| 3,704,040 | 11/1972 | Davis et al. | 298/17 R |
| 3,773,348 | 11/1973 | Davis | 280/124.114 |
| 3,840,244 | 10/1974 | Gee et al. | 280/124.11 |
| 3,940,163 | 2/1976 | Davis et al. | 280/6.15 |
| 4,049,071 | 9/1977 | Stedman | 180/24.07 |
| 5,385,391 | 1/1995 | Dickerson | 298/17 R |
| 5,476,285 | 12/1995 | Dickerson | 298/22 R |

FOREIGN PATENT DOCUMENTS

| | | |
|---|---|---|
| 3434297 | 3/1986 | Germany . |
| 92/04196 | 3/1992 | WIPO . |

*Primary Examiner*—Peter C. English
*Attorney, Agent, or Firm*—Larson & Taylor, PLC

[57] ABSTRACT

A suspension system for a large dump truck. The dump truck having a main frame with laterally spaced frame members each associated with a rear wheel mounting hub with a wheel on each of its sides. Each hub is attached to a respective frame member by an attachment member pivotally attached to the respective frame member by a pivotal mounting and a suspension spring pivotally attached to the hub by a spherical bearing and to the respective frame member at a pivot mounting. The connections of the hub allow for limited pivotal movement of the hub about transverse and longitudinal axes relative to the frame members. A dump body is pivotally attached to the frame members at the pivot mounting or to the rear and above a suspension pivotal connection at a body pivotal connection.

31 Claims, 14 Drawing Sheets

FIG_3. PRIOR ART

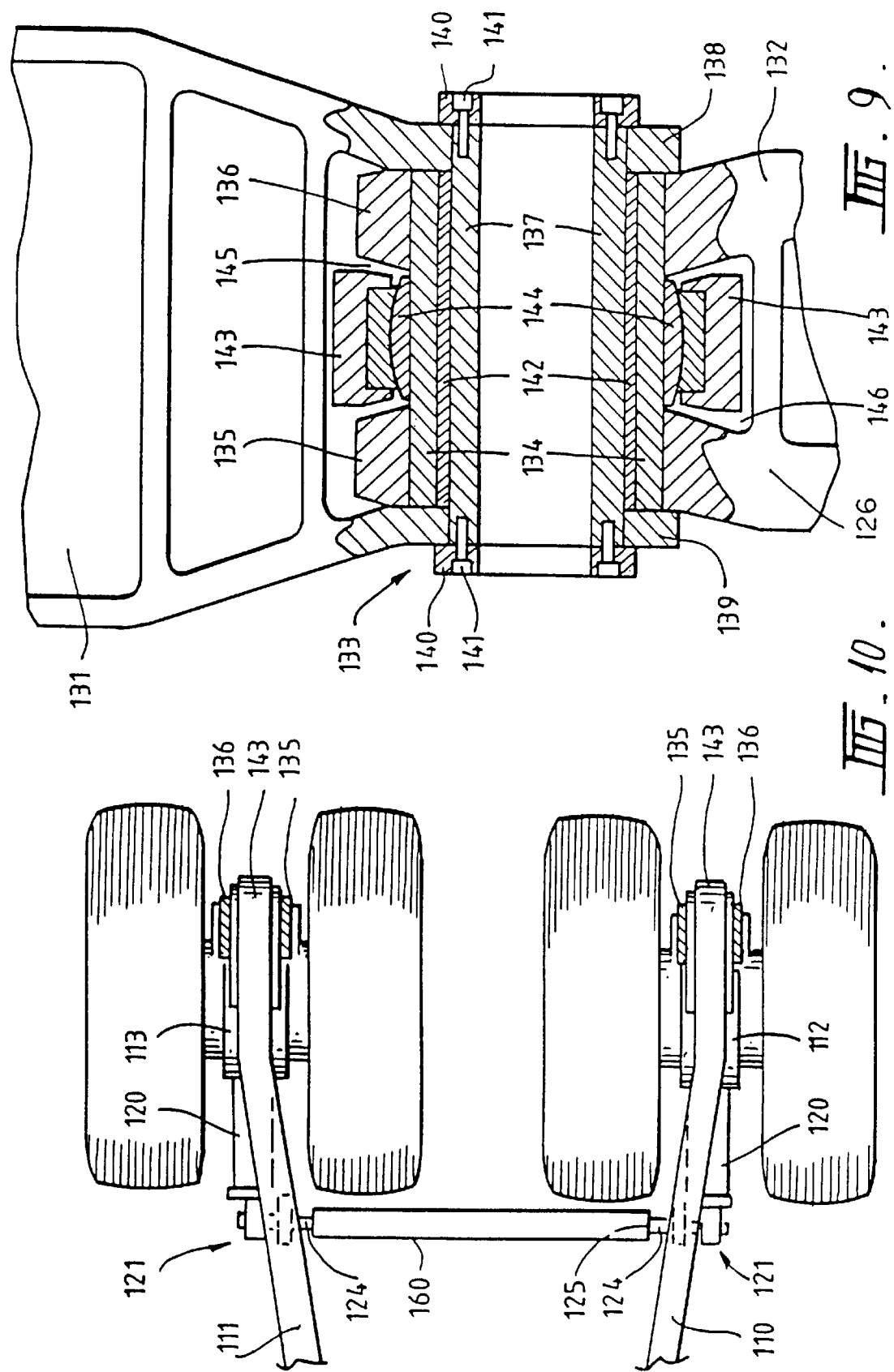

LARGE DUMP TRUCK SUSPENSION

CROSS REFERENCE TO RELATED APPLICATIONS

This is a continuation of application Ser. No. 08/414,619 filed Mar. 31, 1995, now abandoned.

FIELD OF THE INVENTION

This invention relates to suspension systems and configurations for the main structural components of very large trucks of the type used in mining operations.

BACKGROUND OF THE INVENTION

There is much commonality between currently available large mining trucks made by different manufacturers and the following observations are generally applicable regardless of the truck manufacturer:

The empty vehicle weight is a high proportion of the maximum gross vehicle weight. Typically the ratio of payload to empty vehicle weight is only about 1.4:1. This means that much of the cost of operating such trucks is related to moving the empty vehicle weight rather than the payload.

The total width of the four rear tires is large compared to the total width of the truck. Typically 65% of the total width of a truck is taken up by the four rear tires. With present designs of truck this leads to a very narrow main frame for the truck and very high bending loads on the rear axle and rear wheel support systems. The narrow main frame causes shortage of space for maintenance of some components, high stress changes during cornering maneuvers, the need for vertically stiff rear suspension springs and design restrictions on the body. The net effect is high weight and cost for the main frame, the rear axle, the rear wheel support assemblies and the body.

The travel of the rear suspension system of a fully loaded truck is very limited compared to the scale of the truck. Typically the maximum travel in the compression direction of the rear axle relative to the main frame is only of the order of 50 mm when loaded. This limited travel is a result of the need to achieve adequate roll stiffness from the two narrowly spaced rear spring units.

The main frame of these trucks are complex welded steel structures that are heavy (e.g. 16.5 tons for the main frame of a truck with a payload rating of 172 tons), expensive to design, develop and manufacture, and prone to fatigue cracking.

The main load carrying member (the body) of the trucks is a very strong and generally stiff member. This strength and stiffness is a consequence of the need for the body to withstand the shock loads applied during loading of large rocks by large excavators.

The body is generally supported by the main frame of the truck at numerous points. For example at the rear pivot points, at two, four, six or eight points along the underside of the body and in some trucks also at forward extensions of the body which contact the main frame at points which are close to being above the line joining the centers of the front wheels. This system of supporting the stiff body causes high variations of stress levels in the main frame of the truck and the body as the truck traverses over uneven ground and during cornering. This feature causes fatigue problems, high design and fabrication costs and the need for considerable expenditure to limit the unevenness of the ground on which the trucks travel.

The body is tipped (hoisted) by hydraulic cylinders which react against the main frame of the truck at points near to midway between the front and rear wheels. This causes very large bending loads to be applied to the main frame of the truck and requires that the main frame by very massive at the mid sections. It can also cause large stress changes in the body.

The dual rear tires are rotationally locked together. During short radius turning maneuvers (frequent occurrences in typical mining operations), this causes severe scrubbing type wear of the tires due to the differential travel distance effect. Relative scrubbing between the two tires of a dual set is considered to contribute significantly to total wear of rear tires on large mining trucks.

The combination of four wide tires on a solid beam type rear axle causes large variations in individual tire loads as the truck traverses uneven ground conditions. This arrangement also means that it is necessary to take considerable care in matching tire outside diameters and inflation pressures to minimize the unevenness in tire loads on level ground conditions.

In general with currently available truck designs, the transfer of forces between the body and the ground is through a very indirect path which involves high bending loads in the body, the main frame of the truck, the rear axle housing and the rear wheel support systems. Furthermore these bending loads fluctuate greatly as the truck travels over uneven ground, during cornering and when the dump body is raised during unloading.

A typical very large mining truck is shown in FIG. 1 of the drawings of U.S. Pat. No. 5,385,391, and it will be noted that the frame structure is quite substantial and this results from the frame being required to bear the load supported by the body of the truck by contact between the body and the upper surfaces of the frame, and by virtue of the body hoisting rams being connected to the frames as shown. The substantial size of the rear axle is also apparent.

While many truck frame design improvements have been suggested over the years, no one design has successfully addressed more than a few of the difficulties which have been outlined above. For example, U.S. Pat. No. 3,704,040 to Davis et al discloses a frame arrangement in which the front and rear wheel pairs are centrally supported. The independent frame members arrangement which is described as addressing many of the problems created by uneven terrain is extremely complex and consequently expensive and heavy. This patent and the related U.S. Pat. No. 3,773,348 also disclose a rear suspension arrangement suitable for use with centrally supported rear wheel pairs. Centrally supported rear wheel pairs provide the potential to overcome some of the problems inherent in currently available large mining trucks, but to date no successful method of exploiting this potential has been established.

In addition to the above, most truck body designs have remained essentially unchanged for many years, being characterized by extremely heavy structures reinforced by means of relatively closely spaced transverse beams assisted by limited longitudinal beams, thereby resulting in a body structure of extremely high weight.

Similarly, most conventional truck bodies have a sloping floor and vertical longitudinal sides arranged at a constant width spacing. In one departure from this approach, a body having a flat floor and vertical sides which are wider apart at the rear of the body than at the front of the body was designed. Although in this arrangement, the wear on the sides of the body is reduced, the flat body floor is not compatible with most truck main frame designs and it increases the height of the center of gravity of the truck unless the overall width and/or length of the truck is increased.

At least some of the problems outlined above are overcome in the very large vehicle described in U.S. Pat. No. 5,476,285.

FIGS. 1 to 7 of the drawings show the truck frame construction of U.S. Pat. No. 5,476,285. As shown in FIGS. 1–5, the truck frame comprises a pair of relatively lightweight longitudinal members 10 and 11 suspending rear wheel mounting hubs 12 and 13 towards their rear ends. The longitudinal members 10 and 11 are connected at their forward ends by a substantial cross member 14, such as a mounting collar which generally includes mounting points for the front suspension (not shown) for the front wheels $W_f$, at the front by a bumper 60 and at the rear, forwardly of the rear wheels, by a cross member 60a, which forms part of the support means for the rear wheel mounting hubs 12 and 13, as will be described further below. The front suspension may take the form described in greater detail in U.S. Pat. No. 5,385,391 or in any other suitable form.

As shown in FIGS. 3, 4 and 5, the wheel mounting hubs 12 and 13 support drive means for the rear wheels $W_r$, such as electric traction motors 16, 17, 18 and 19, which are in turn connected to the rear wheels $W_r$, with each wheel being mounted one on either side of the hubs 12 and 13. The location of the rear wheel mounting hubs 12 and 13 between each pair of rear wheels $W_r$ allows independent rotation of each wheel thereby avoiding tire wear caused by short radius turning.

The rear suspension system of FIGS. 1–6 includes rear wheel mounting hubs 12 and 13 mounted to the longitudinal frame members 10 and 11 by means of hollow forwardly extending attachment members 20 which are attached to pivotal mountings 21 which are in turn pivotally secured to a cross member 60a which is rigidly secured to the frame members 10 and 11. The attachment members 20 and the rear wheel mounting hubs 12 and 13 may be formed separately or as an integral unit, and the hollow attachment members 20 operate to convey cooling air to the motors 16 to 19 attached to the hubs 12 and 13.

Each pivotal mounting 21 includes a top transverse journal 22 and a bottom longitudinal journal 23 which allows two rotational degrees of freedom for the hubs 12 and 13. The transverse journal 22 engages spindle sections on the ends of a shaft 24 (FIG. 5) which forms part of the rear cross member 60a for the frame members 10 and 11, which, as shown in FIGS. 1 and 2, are of increased depth in this region to allow the cross member 60a to penetrate the side plates of the frame members 10 and 11, to which the cross member 60a is rigidly secured in some suitable manner. Each lower journal 23 receives the end portion of one of the attachment members 20, within which journal 23 this end portion is free to rotate, the end portion of the attachment member 20 being restrained within the journal by a flange 23a formed on the attachment member 20 and a nut 23b engaging the end portion of the attachment member 20, as shown most clearly in FIG. 6 of the drawings.

The frame members 10 and 11 also provide journals for mounting members 26 for vertically compliant suspension means or spring units 27, the mounting members 26 also having integrally formed journals 28 which receive pivot pins 29 about which the body B of the truck also pivots. The spring units 27 include cylinder housings 41 rigidly attached to the mounting members 26 and receiving piston units 40 which are attached to the mounting hubs 12,13 by rearward extensions 42. The spring effect may be obtained by the compression of a gas within the cylinder or by other suitable means.

The mounting members 26 have downwardly extending rigid flanges 30 which are adapted to be engaged by a projection 31 extending from a respective hub 12,13 at a position closely adjacent the flanges 30 whereby transverse rotation of the hubs 12 and 13 is limited.

Rotation of the attachment member 20 and its connected hub 12,13 in the other direction is confined to the vertical longitudinal plane by its attachment to the piston 40 and the confinement of the piston 40 by the cylinder of the spring means 27 to travel along the axis of the cylinder. The attachment of the piston 40 to the rearward extension 42 is by a restrained spherical bearing 45 between the piston 40 and the rearward extension 42.

The above described coupling and spring unit for the rear wheel mounting hubs 12 and 13 allows the hubs 12 and 13 to pivot about both longitudinal and transverse axes to facilitate greater flexibility in the movement of each hub 12,13 with respect to the frame and truck body B. One such movement is illustrated in FIG. 4 of the drawings.

SUMMARY OF THE INVENTION AND OBJECTS

It is an object of the present invention to provide a further improved suspension system and configuration for a very large vehicle in which at least some of the problems outlined above are ameliorated.

In one aspect of the invention, a suspension system for a very large vehicle is provided, comprising a substantially rigid main frame having a forward section carrying front wheels and a rear section, said rear section being substantially rigidly attached to said front section and including spaced frame members each associated with a wheel mounting hub, each hub independently supporting a pair of rear wheels one either side of the hub, said suspension system comprising a forward attachment means for said hub pivotally mounted on said frame members to allow limited rotation of said hub about a longitudinal and a transverse axis relative to each frame member, and a substantially vertically compliant suspension means.

The substantially vertically compliant suspension means is pivotally connected to said hub to allow relative rotation of said hub about a longitudinal axis and a transverse axis relative to the frame member. The suspension means is also pivotally connected to the frame member to thereby limit relative rotation of the hub about a transverse axis relative to the frame member.

In a preferred form, the invention provides a main frame forward section which is relatively narrow and extends between said front wheels, said rear section being wider than said front section, said spaced frame members including elongate frame portions which extend gradually inwardly from said wider rear section to said narrower front section such that the transition between said front and rear sections is gradual rather than abrupt.

The forward attachment means is preferably pivotally mounted on mounting means extending laterally outwardly from said frame members, said main frame further comprising a cross member extending between said spaced frame members and secured thereto to minimize twisting loads imposed on said rear frame section by said mounting means for said forward attachment means.

The cross member preferably comprises a shaft passing through portions of said frame members and having end portions extending laterally outwardly from said frame members to provide said mounting means for said forward attachment means.

The forward attachment means may be substantially tubular and the pivotal mounting may have a passage through it to convey cooling air to electric traction motors supported by the rear wheel mounting hub.

In another aspect of the invention there is provided a large vehicle comprising a suspension system as defined above, a substantially rigid load supporting body, means for pivotally mounting said body with respect to said main frame, and means for maintaining transverse spacing between said rear wheel pairs.

By providing the principal reinforcement of the body by means of longitudinally extending strengthening beams, the necessary body strength can be achieved with significant reductions in the weight and the manufacturing cost of the body.

The body is pivotally mounted on the frame of the truck and it is preferably supported only at the pivot points and at one or two points near the front of the body, these forward support(s) lying close to and above the line between the centers of the front wheels of the truck. The hydraulic cylinder(s) used for tipping the body about is pivot points preferably react onto the main frame of the truck at one or two points which are also close to and above the line between the centers of the front wheels of the truck. By these means the body is prevented from exerting large being moments in the main longitudinal members of the main frame of the truck. The forward body supports may include a positive location system between the body and the main frame of the truck so that the body can provide a significant proportion of the strength that is required between the front and rear wheels when it is in the 'down' position.

The use of rear wheel mounting hubs positioned between each pair of wheels suits the use of electric motor systems to drive the rear wheels. The use of such motors has the inherent advantage of enabling the problems associated with a solid rear axle to be easily overcome thereby reducing the weight f the rear wheel supporting systems, improving load sharing between the rear tires and reducing the rear tire wear effects of such axles. However, mechanical drive systems may be utilized with acceptable results. Advantages may be taken of the rear wheel mounting arrangement to incline one or both of the wheels which are mounted on the hub at an angle other than vertical so as to improve the stability of the vehicle during cornering maneuvers and when operating on cross (transverse) slopes. The location of the rear wheel mounting hubs between each pair of wheels allows independent rotation of each wheel thereby avoiding tire wear (caused by short radius turning.

In another aspect of the invention, there is provided a large vehicle including a substantially rigid main frame having a forward section carrying front wheels and a rear section, said rear section being substantially rigidly attached to said front section and including spaced frame members each associated with a wheel mounting hub, each hub independently supporting a pair of rear wheels, one on either side of the hub and a suspension system, said suspension system including a forward attachment means for said hub pivotally mounted to said frame member to allow limited rotation about a longitudinal and transverse axis relative to each frame member and a vertically compliant suspension means, and a substantially rigid load support body, means for pivotally mounting said body with respect to said main frame in proximity of the pivotal mounting of the suspension means to said frame member, and means for maintaining transverse spacing between said rear wheels.

The vertically compliant suspension means is pivotally attached to said hub to allow limited relative rotation of said hub about a longitudinal and a transverse axis relative to said frame member. The suspension means is also pivotally connected to the frame member to allow relative rotation of said hub about a transverse axis relative to the frame member.

The suspension means preferably includes a suspension support member which is mounted for pivotal movement on said frame member. In one preferred form, the suspension support mounting is in proximity to or coincidental with the pivot mounting of the body to the main frame.

In a preferred form of the invention, the pivotal connection of the suspension means to the frame member permits rotation of said suspension means only about an axis which is parallel to the body pivoting axis. The body pivot may include a cylindrical bearing which engages with the frame members and the support of the suspension means.

In an alternate form of the invention, the pivotal connection of the suspension means to the frame member, or the frame member itself, allows limited rotation of the hub in a transverse-vertical plane relative to the frame member. The suspension support of the suspension means may be provided with a yoke for supporting a spherical bearing, said spherical bearing engaging bearing surfaces formed in the respective frame member. The yoke may be provided with a transversely extending bush into which is journalled an inner sleeve for pivotal mounting of the body support.

Alternatively, the pivotal mounting of the body support may provide the support for the spherical bearing, said bearing engaging bearing surfaces formed in the respective frame member and eliminating torsional loading on the frame member between the spherical bearing housing on the frame member and the forward attachment means for the hub on the frame member.

The pivotal mounting of the suspension means and the body allows the main frame, the body support and the suspension means to each pivot independently relative to the other two. This enables said loads generated in the tire road interface to be transferred directly into the dump body supports substantially by-passing the frame.

In addition to substantially direct transfer of the dump body loads onto the suspension means, the need for a device such as an anti-sway bar, Panhard rod or similar device for transferring cornering loads between the rear axle and the dump body is eliminated.

The forward attachment means is preferably pivotally mounted on a mounting arm mounted on mounting means extending laterally outwardly from said frame members, the mounting means allowing pivotal movement of the mounting arm about the transverse axis and the longitudinal axis.

While having the pivotal mounting of the body coincidental with the pivot mounting of the suspension means has a number of advantages, it is preferable in some instances to have the pivot mounting of the body displaced a short distance from the pivot mounting of the suspension means. The short intervening section of the main frame is then used to transfer side loading between the dump body and the suspension means.

Accordingly, the pivotal mounting of said body on to said frame members may be spaced from the pivotal mounting of the suspension means to the frame members and preferably spaced rearwardly and/or upwardly from the pivot mounting of the suspension means to the frame members.

BRIEF DESCRIPTION OF THE DRAWINGS

The foregoing and other features, objects and advantages of the present invention will become more apparent from the following description of the preferred embodiment and the accompanying drawings in which:

FIG. 9 is a rear sectional view of the embodiment shown in FIG. 8 taken along the line 9—9;

FIG. 10 is a fragmentary plan view of the truck frame in accordance with the embodiment of FIG. 8 with the body removed;

DESCRIPTION OF PREFERRED EMBODIMENTS

Figure 8:
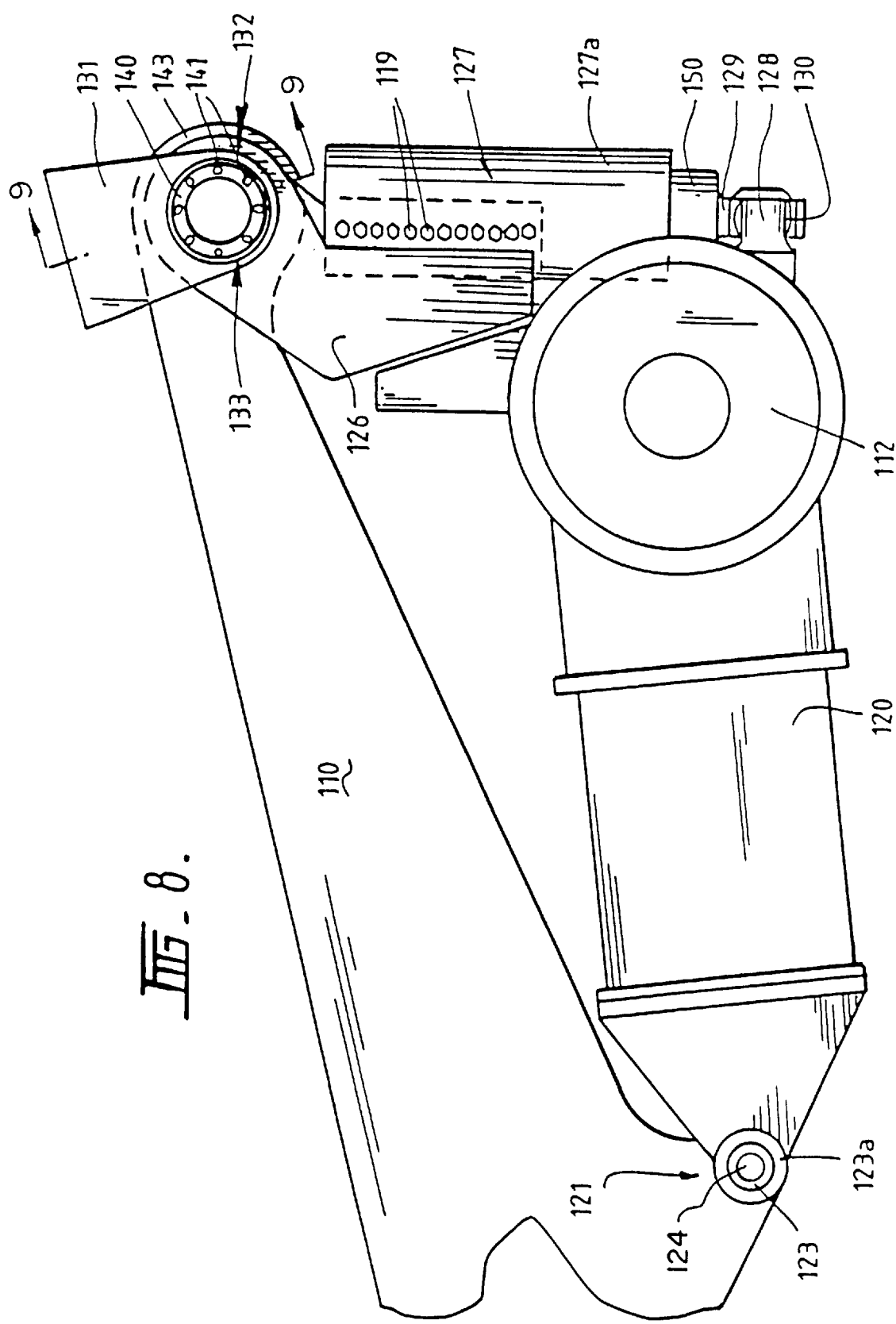
FIG. 8 is a side elevational view of an embodiment of the suspension system of the present invention, which replaces the suspension system in the truck shown in FIGS. 1–7.

In the first embodiment of the present invention shown in FIGS. 8, 9 and 10, the rear wheel mounting hubs 112 and 113 are shown mounted to the longitudinal frame members 110,111 by means of forwardly extending attachment members or mounting arms 120. The attachment members 120 are attached to pivotal mountings 121 which in turn are pivotally secured to respective frame members 110 and 111. The attachment members 120 and the rear wheel mounting hubs 112,113 may be formed separately or as an integral unit.

Each pivotal mounting 121 includes a transverse journal 123 which engages spindle sections or, the ends of a shaft 124 which is attached to frame members 110,111. Rear cross member 160 is formed by connecting the inside ends of shaft 124. Connection 125 at each end of rear cross member 160 can be either a rigid joint, a pin joint or a suitable flexible joint.

Cross member 160 is optional but is useful in that it helps to maintain constant separation between the end portions of attachment members 120 which would otherwise tend to increase under tractive effort if cross member 160 were not present and cause small amounts to "toe out". Cross member 160 also reduces the torsional loading about the frame long-axis under tractive effort on frame members 110,111. During cornering cross member 160 acts as an equalizer spreading the unequal cornering loads transmitted through attachment members 120 to pivotal mountings 121 across from members 110,111. Rear cross member 160 is also useful for mounting ancillary equipment such as pumps, valves, etc.

The bottom transverse journal 123 is received within a spherical bearing 123a on the end portion of attachment member 120. The journal 123 allows rotation of the hub about a transverse axis and a longitudinal axis.

Rotation of the attachment member 120 and respective connected hub 112,113 about a transverse axis is confined by a vertically compliant suspension means 127. The lower end 129 of the suspension means 127 engages a longitudinal extension 128 of the hub 112,113. The longitudinal extension 128 is preferably received within a spherical bearing 130 in the lower end 129 of the suspension means so as to enable rotation of the hub about the vehicle's longitudinal and transverse axes. The spherical bearing 130 also allows limited relative rotation between the suspension means and the hub about a transverse axis.

The suspension means 127 which is preferably a spring consisting of a cylinder 127a and piston 150, is received at its upper end within a mounting member 126 and is secured by bolts 119. The mounting member 126 pivotally engages the body pivot member 131 and the ends of 143 of frame members 110 and 111. The mounting member 126 is provided with a yoke 132 for receiving a suspension/body pivot mounting 133 which allows independent relative movement between the body pivot member 131, suspension means 127 and frame members 110,111 about an axis through the suspension pivot and normal to the vehicle's vertical plane.

The suspension/body pivot mounting 133 includes a cylindrical bush 134 which extends through both arms 135,136 of the yoke and into which is journalled an inner sleeve 137. The inner sleeve extends beyond the cylindrical bush and is received within apertures formed in the body pivot arms 138,139. The inner sleeve 137 is secured in position by retainers 140 and retaining bolts 141. To reduce frictional forces between the cylindrical bush and the inner sleeve, a cylindrical bearing 142 may be provided, preferably in the form of a bronze bearing. In this way movement of the inner sleeve 137 relative to the cylindrical bush 134 corresponds to pivotal movement of the body pivot relative to the suspension means.

The ends 143 of the frame members 110,111 engage the respective cylindrical bush through a spherical bearing 144 located on the center of the outer surface of the cylindrical bush in the vicinity of the space between the arms 135,136 of the respective yoke 132. The ends 143 of the frame members 110 and 111 are received within the space between the respective yoke arms and are provided with a bearing which encircles the spherical bearing 144 located on the respective cylindrical bush 134.

Since the position of the cylindrical bush 134 is fixed relative to the mounting member 126 of the suspension means 127, relative movement between the suspension means 127 and frame members 110 and 111 is accommodated by relative movement about spherical bearing 144.

When the ends 143 of the frame members are received within the respective yoke 132, a small gap 145,146 between the frame member ends and the respective yoke 132 exists to allow limited rotation of the mounting member 126 about the vehicle's longitudinal axis.

Since the yoke 132 of the mounting member 126 of the suspension means is received within the arms 138,139 of the body pivot, side loads generated in the ground plane are transferred directly between the rear axle and the dump body and torsional moments about the long axis of frame members 110,111 are minimized.

As a further refinement, it is thought that by laterally off-setting the vertical axis of the vertically compliant suspension means from the vertical axis of the yoke, enhanced distribution of the torsional moments on the body can be accomplished.

Figure 11:
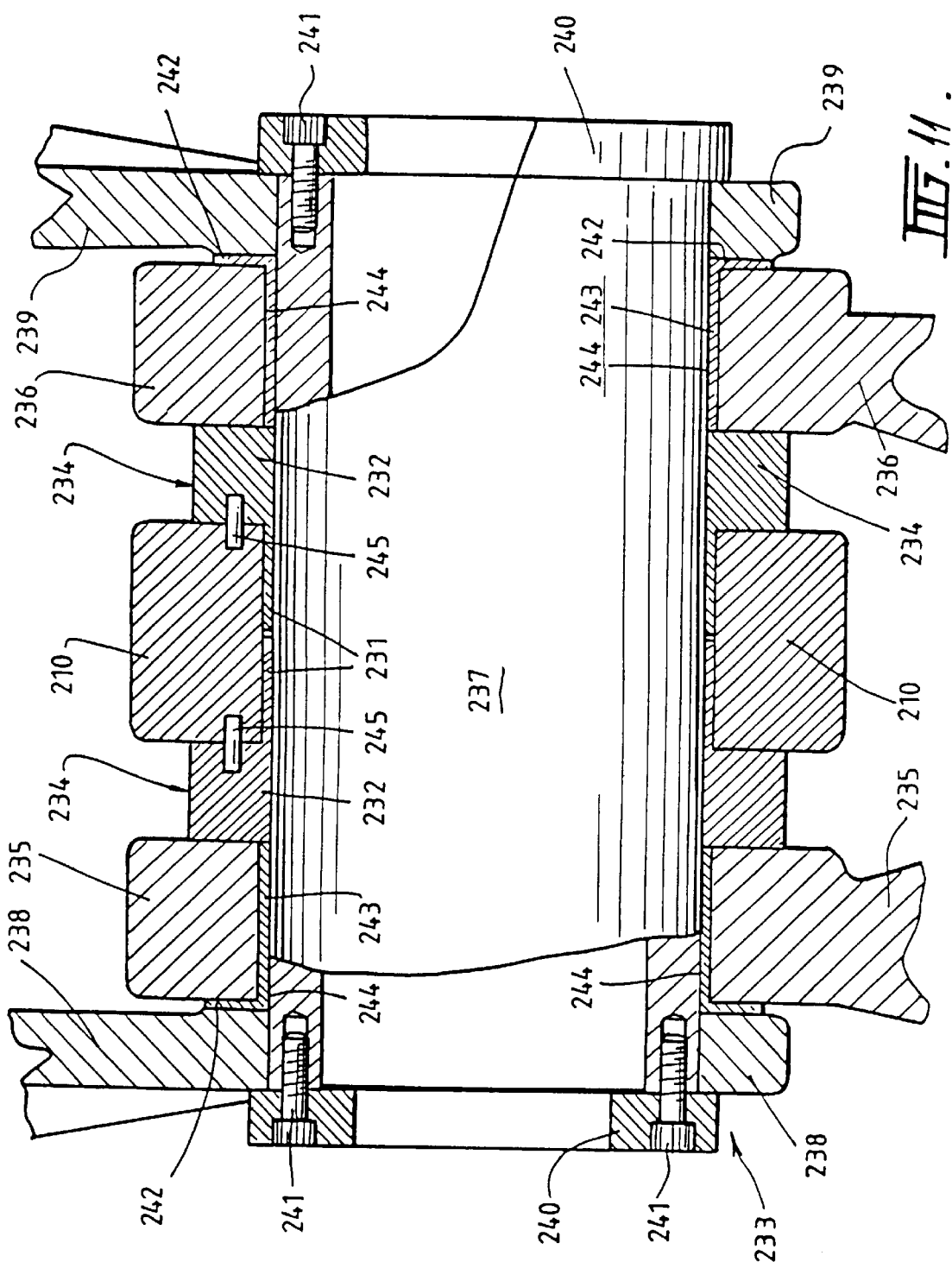
FIG. 11 is a rear sectional view of a second embodiment of the suspension system of the present invention.
Figure 12:
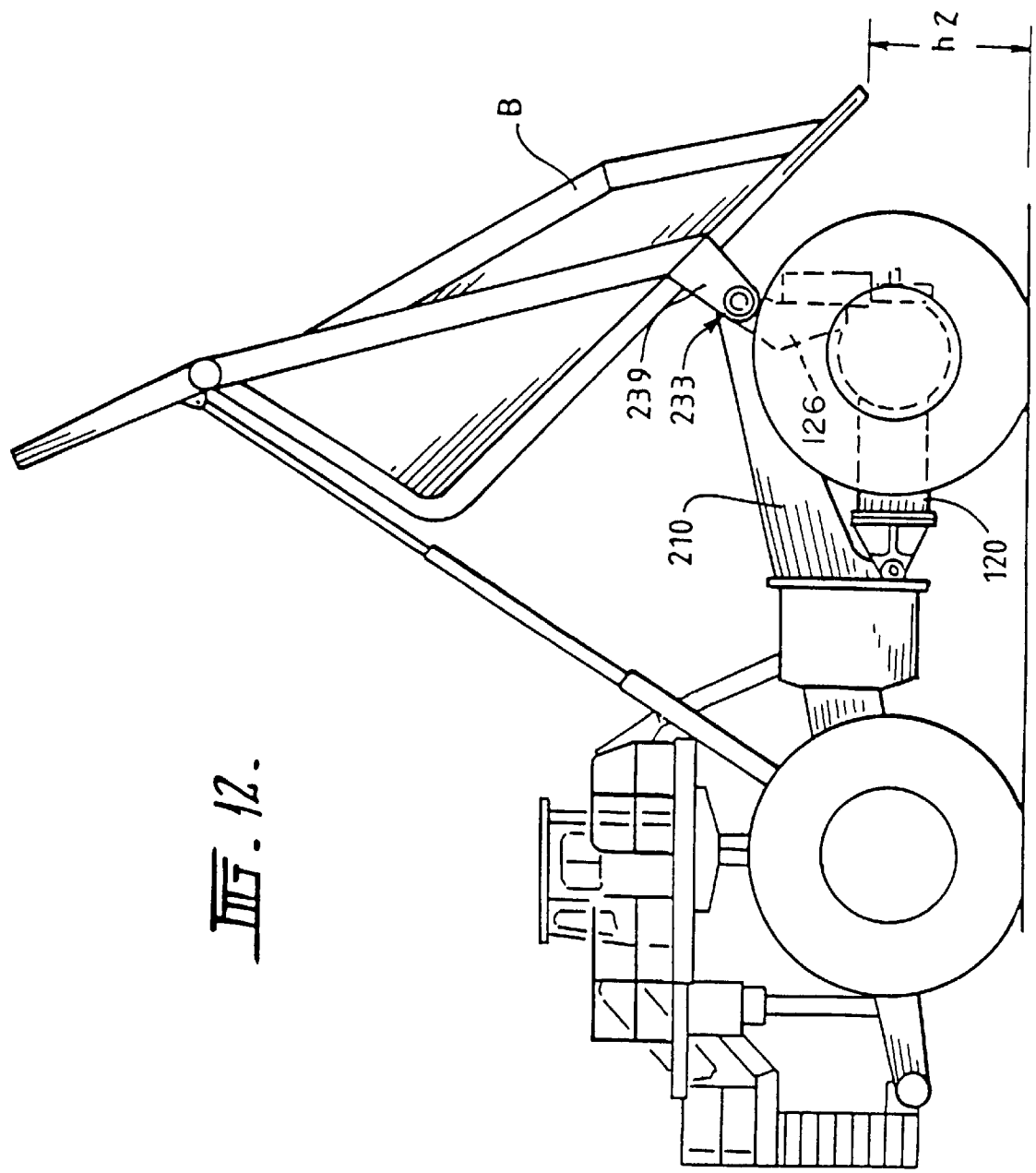
FIG. 12 is a side view of the improved truck construction incorporating the suspension systems of FIGS. 8, 10 and 11 of the present invention.

In FIGS. 11 and 12, an alternative second embodiment of the suspension/body pivot mounting 233 is illustrated. This embodiment of suspension/body pivot mounting may be substituted for the mounting 133 shown in FIG. 9.

In the alternate embodiment, the arms 235,236 of the suspension mounting member 126 are positioned on either side of the frame member 210, and a cylindrical shaft 237 extends through apertures in both arms and the frame member 210. The cylindrical shaft is received within apertures formed in the body pivot arms 238,239 and secured in position by retainers 240 and retaining bolts 241.

To reduce frictional forces between the cylindrical shaft, arms 235,236, frame member 210 and body pivot arms 238,239, bushings 234 and 244 may be provided.

The bushings 234 fit within the aperture of the frame member 210, and between the arms 235 and 236 of the suspension mounting member 126. Each bushing 234 may be shaped to provide journal bearing sections 231 and spacer bearing sections 232. Bushings 234 may be secured to the frame member 210 using pins 245 which are received within aligned holes in abutting faces of spacer sections 232 and frame member 210 to prevent relative movement and associated frictional wear between the bushings 234 and the frame member.

Bushings 244 fit within the apertures in the arms 235 and 236 of the suspension mounting member 126. The bushings 244 may be shaped to provide journal bearing sections 243 and spacer or thrust bearing sections 242.

The arrangement of FIG. 11 functions similar to the arrangement of FIGS. 8, 9 and 10 except that no rotation of the mounting member 126 about the vehicle longitudinal axis is provided for. For some vehicle configurations this restriction may be acceptable. This arrangement is a much simpler construction and replacement of the bearings is easier and less expensive compared with replacement of the spherical bearing of FIG. 9.

Figure 13:
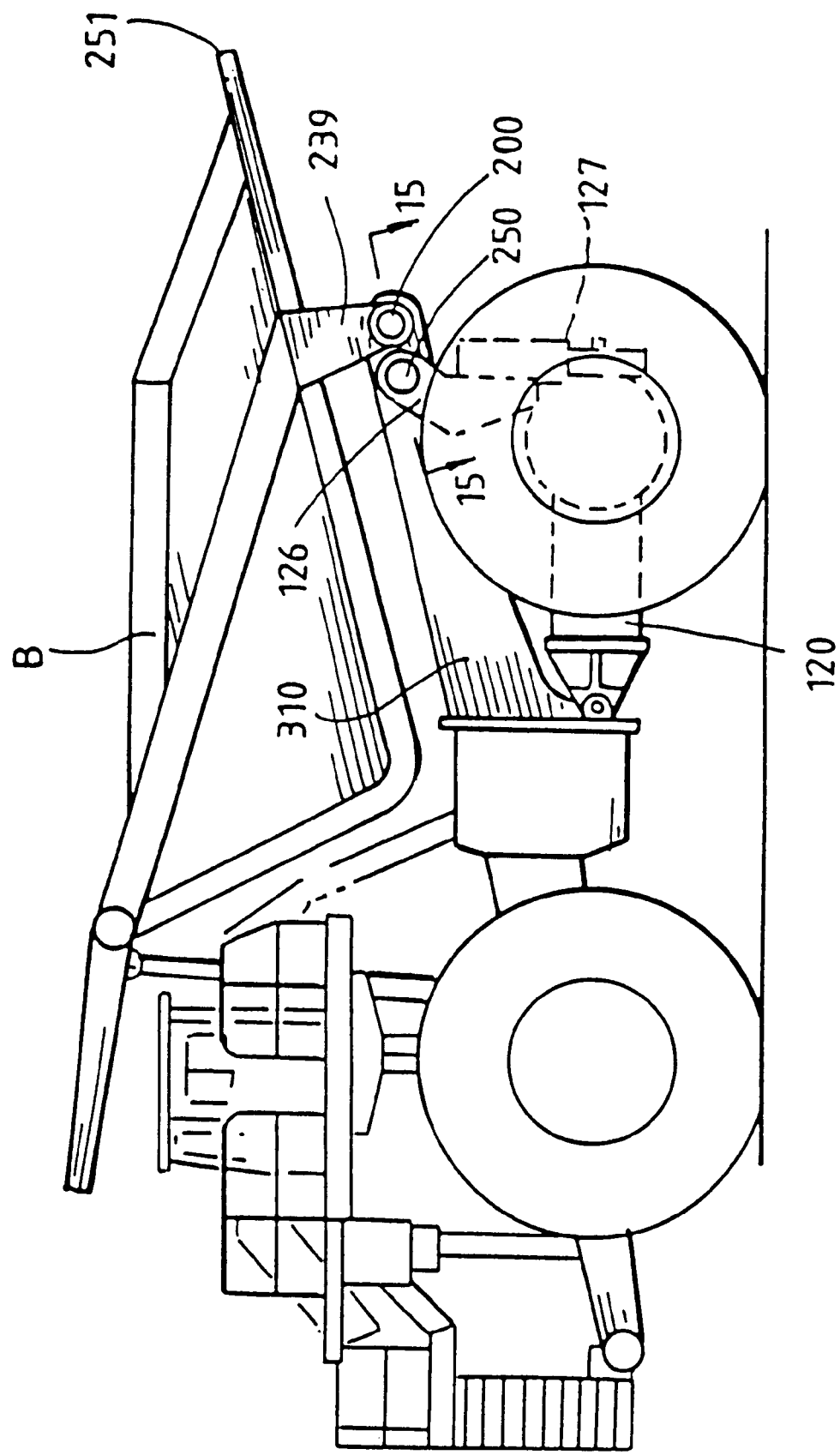
FIG. 13 is a side view of the improved truck construction incorporating a suspension system/body attachment in accordance with a third embodiment of the invention.
Figure 14:
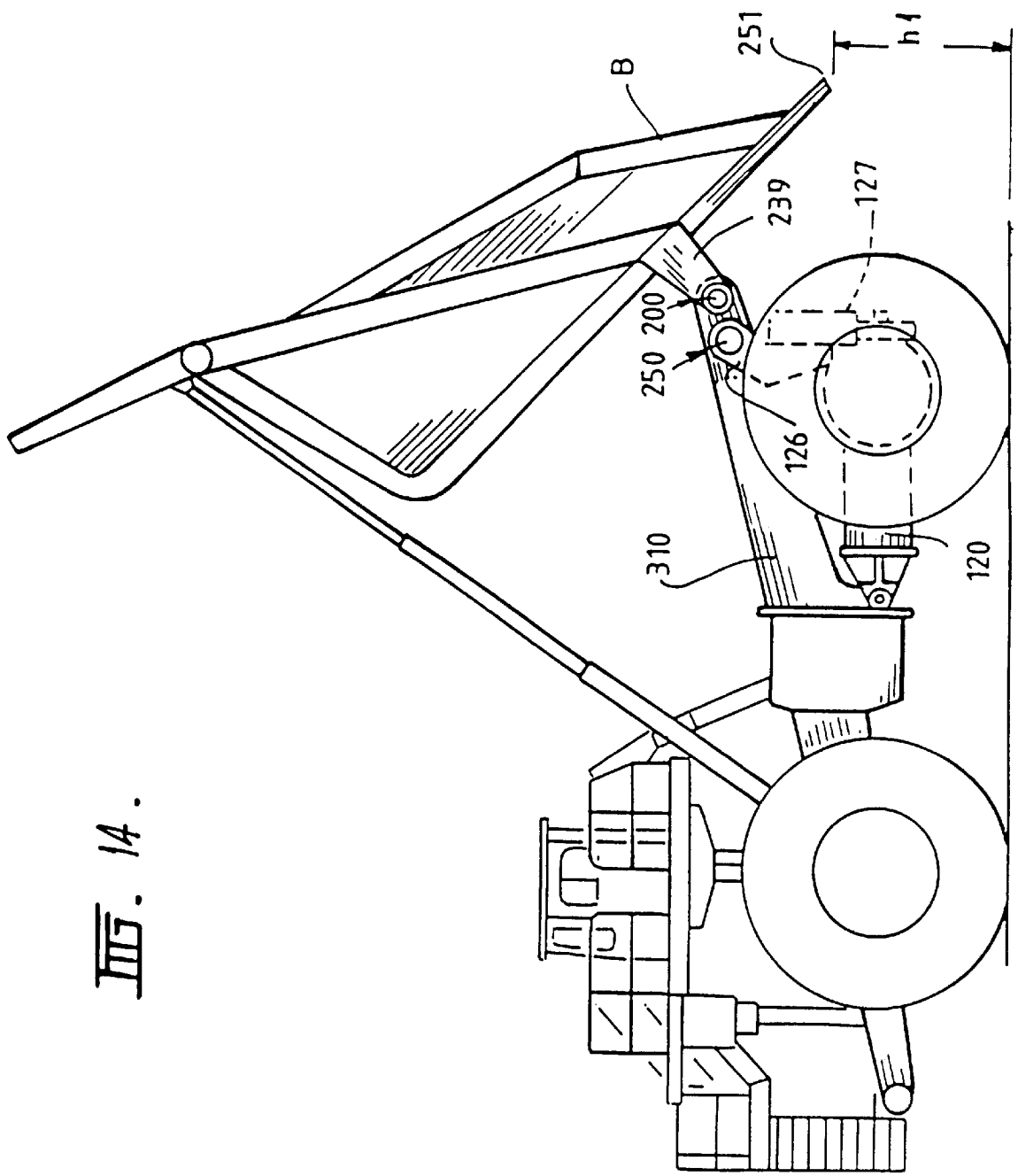
FIG. 14 is a side view of the embodiment of FIG. 13 showing the body tilted about the connection to the main frame.
Figure 15:
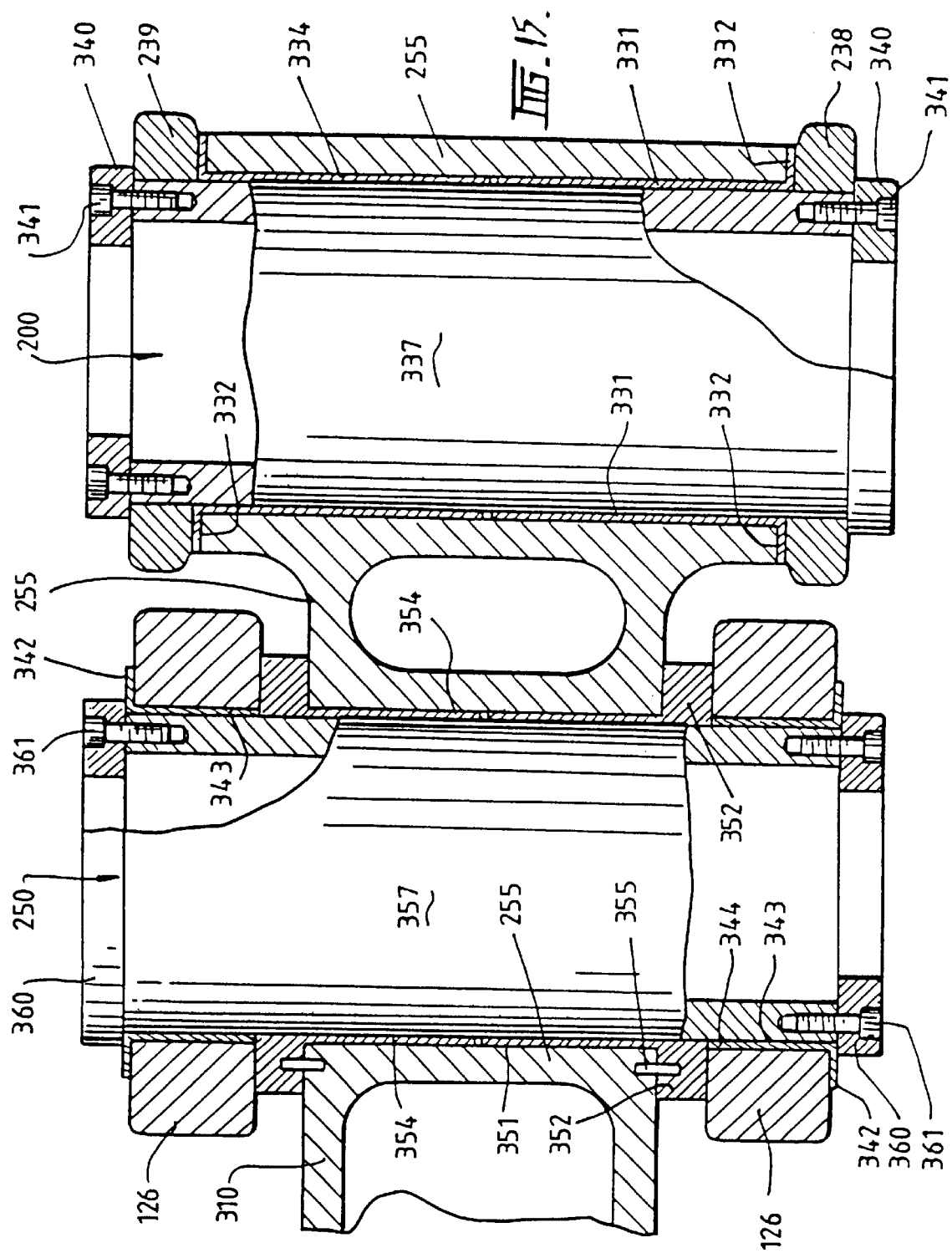
FIG. 15 is a sectional view along line 15—15 of FIG. 13.

A further arrangement of body pivot mounting and suspension system mounting to the main frame is shown in FIGS. 13, 14 and 15. In this arrangement, the rearward mounting of the attachment member 120 to the frame member 310 is similar to that shown by the combination of FIGS. 8 and 11.

The suspension means includes spring unit 127 attached to a mounting member 126. The mounting member 126 is pivotally connected to the frame member 310 which allows limited rotation of the suspension means relative to the frame member about a transverse axis. The pivotal connection is typically a cylindrical bearing which does not permit rotation of the suspension means in the transverse-vertical plane.

As shown in FIG. 15, the pivotal connections 200,250 of the body B and the suspension mounting member 126 to the frame member 310 are within section 255 of the frame member. The body pivot connection 200 comprises a cylindrical shaft 337 which is received within apertures in body pivot arms 238,239 and secured in position by retainers 340 and retaining bolts 341. The bushings 334 of the body pivot connection 200 fit within an aperture of section 255 of the frame member 310. Each bushing 334 may provide journal bearing surfaces 331 and spacer bearing surfaces 332.

The pivotal connection 250 of the suspension member 126 also includes a cylindrical shaft 357 received within apertures in the suspension member 126 and secured in position by retainers 360 and retaining bolts 361. Bushings 354 fit within the aperture in section 255 of frame member 310 and between the arms of the suspension mounting member 126. Each bushing 354 may provide journal bearing sections 351 and spacer bearing sections 352. To prevent relative movement and associated frictional wear between bushings 354 and section 255 of frame member 310, spacer sections 352 are secured to section 255 using pins 355 which are received within aligned holes formed in the abutting surfaces of spacer sections 352 and section 255.

Bushings 344 may be provided to fit within apertures in the arms of suspension mounting member 126. Bushings 344 preferably include journal bearing sections 343 and spacer or thrust bearing sections 342.

The pivotal connection 200 of the body to the frame member 310 of this arrangement is displaced rearwardly along the frame member 310 from the suspension system mounting to the frame member as shown in the drawings. The frame members 310 may slope upwardly from the front of the vehicle to the rear. Consequently, if the distance from the suspension pivot to the rear end 251 of the body remains the same, by displacing the body pivot mounting 200 rearwardly from the suspension system mounting 250, the height h1 of the body rear end from the ground is greater than height h2 when the body pivot mounting and suspension system mounting are coincidental as shown in FIG. 12. Additionally, the distance from the body rear end 251 to the wheels is increased when the body is raised.

This is particularly advantageous in mine site situations where a guide mound may be used to indicate the edge of a pit or some other embankment and the driver of a large mining vehicle reverses up to the mound until the rear wheels contact before tipping the contents from the body.

Furthermore, while the suspension means is described as being vertically compliant, the applicants have found some advantages in having the suspension means slightly inclined from the vertical towards the rear of the vehicle. In this way, it is possible to simultaneously achieve an increase in the height of the rear end of the dump-body above ground when the body is in the raised position, and an increase in the distance from the rear of the dump-body to the wheels, with the preferred embodiment shown in FIG. 8 by simply moving the pivotal connection between the dump-body, the frame and the suspension rearwardly and upwardly by an appropriate amount. This has many advantages, including making more space for a suspension unit with longer stroke. By increasing the angle between the frame members 110,111 and the horizontal there would be more clearance between the front section of the rear-axle housing and the frame to accommodate relative movement between the rear-axle housing and the frame. Furthermore, by moving the pivotal connection between the dump-body, the frame and the suspension means shown in FIG. 8 rearwardly, and thereby angling the rear suspension unit slightly rearward, it is possible to apply a preload on the rear-axle extension 128. This has some advantages over the general embodiment shown in FIG. 8.

It can be seen that the arrangement and the strength of the body pivot 200, the suspension member pivot 250 and the section of the main frame 255 which contains these two pivots is such that most of the transverse twisting loads from the supports 126 is transferred into the body pivot arms 238,239 rather than into the forward sections of the frame members 310. In this way compared with prior art designs, enhanced absorption of the torsional forces can be accomplished.

While the above described suspension systems are suitable for trucks having frames of the type described above, or of the type otherwise described in U.S. Patent No. 5,385,391, it should be appreciated that the suspension system is equally applicable to other forms of truck having independent rear axles supported in a different manner to that described above.

Referring additionally to FIGS. 1, 2, 3, 4, 6 and 7 of the drawings, the truck body B according to a particularly preferred embodiment comprises side walls 61 and 61a, a floor 62, a front wall 63 and a forwardly extending cabin-protecting extension 64. The truck body B has a number of novel features, including that the main reinforcing beams under the floor 62, front wall 63 and extension 64 extend longitudinally of the body, as shown at 65 to 70, and only one transverse reinforcing beam 72, located close to or on a line between brackets 73 formed to receive the pivot pins 29 engaging the journals 28, as previously described. Two additional beams 74, 75 and 76, 77 extend along each side wall 61 and 61a as shown most clearly in FIG. 3 of the drawings. The transverse beam 72 extends the full width of the floor 62, and preferably extends up the sides 61,61a of the body as shown.

As mentioned earlier in U.S. Pat. No. 5,476,285, conventional truck body designs rely on numerous transverse beams, and generally only two longitudinal beams running above the main frame of the truck or along the sides of the body floor. The principal advantages of the new body design described above include a significant reduction in the body weight, and a significant reduction in the manufacturing cost of the body, the body still having sufficient strength to allow it to be supported only at the front and at the body pivots, thereby allowing the weight and cost of the main frame of the truck to be reduced as described in greater detail in U.S. Pat. No. 5,385,391.

Figure 1:
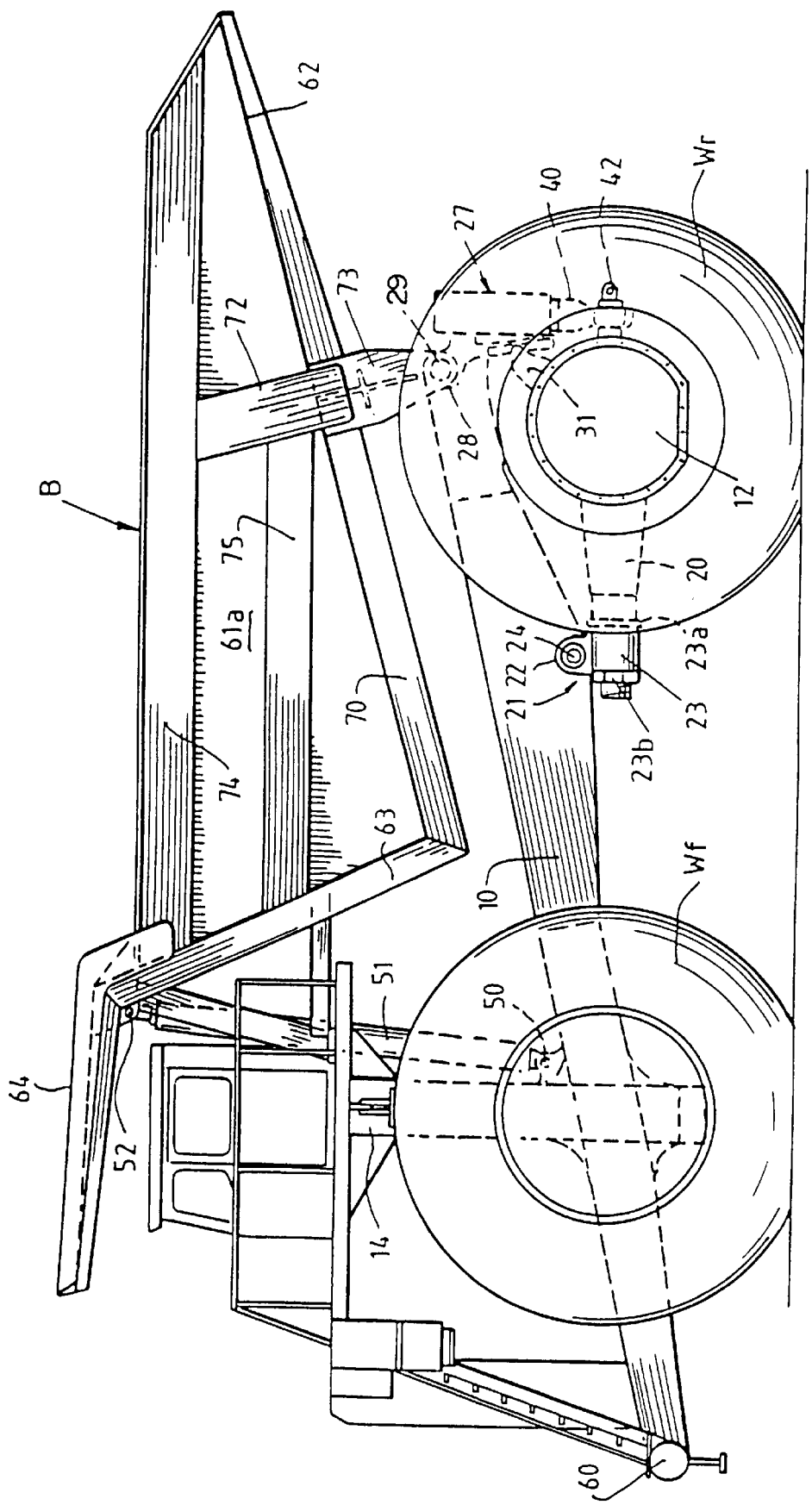
FIG. 1 is a side elevation of a truck incorporating an embodiment of a suspension system in accordance with an earlier invention.
Figure 2:
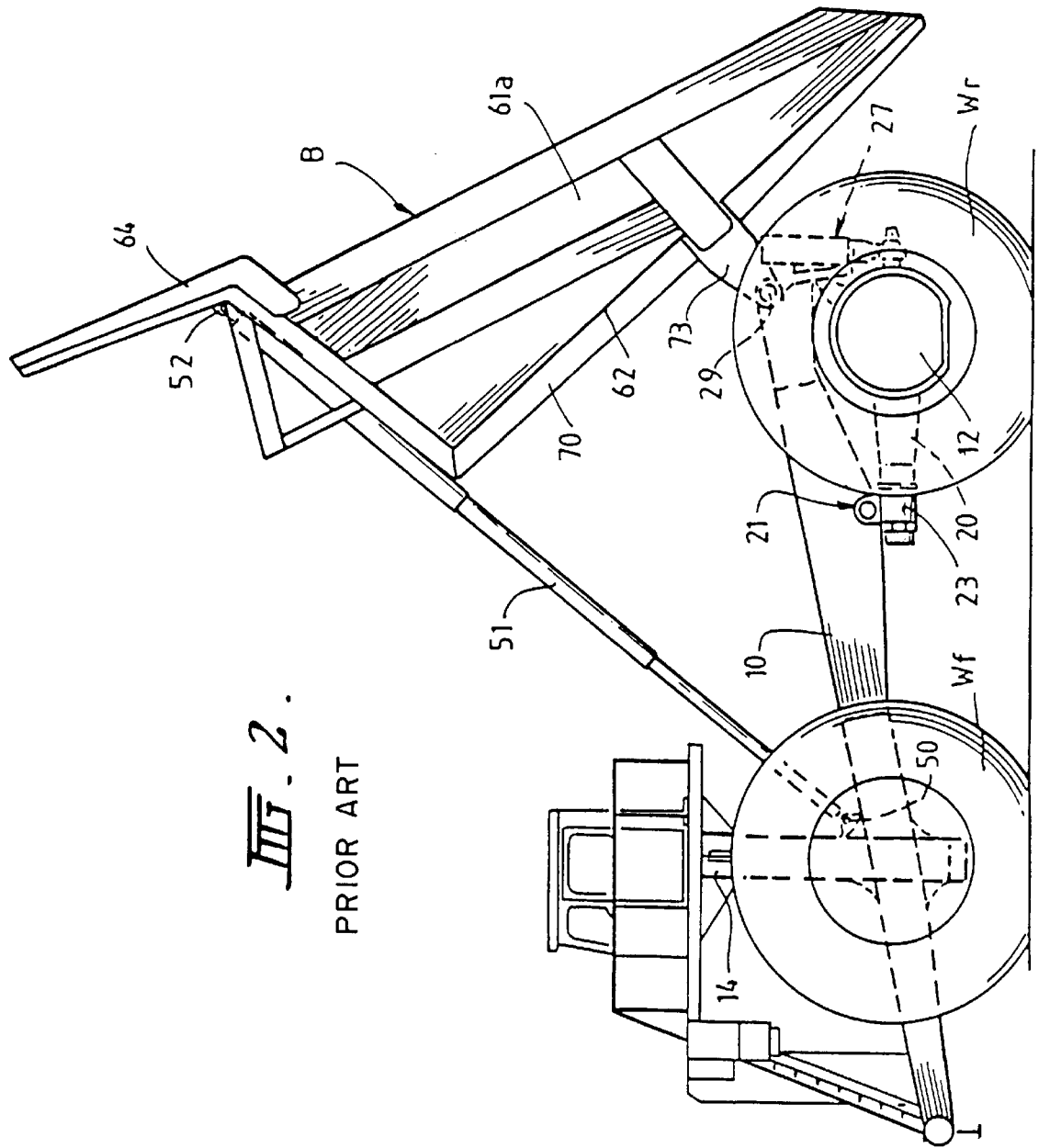
FIG. 2 is a side elevation similar to FIG. 1 with the truck body elevated.
Figure 3:
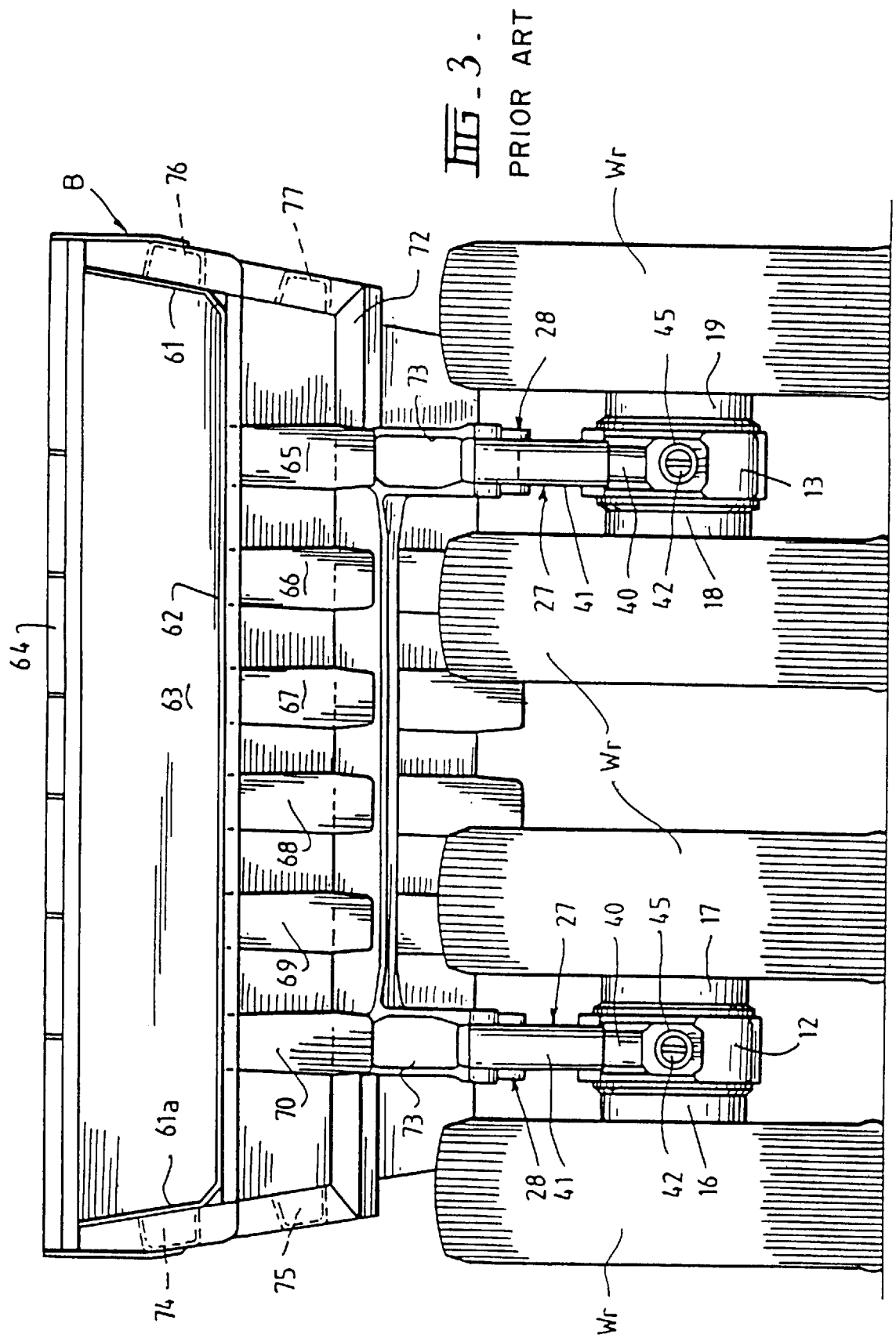
FIG. 3 is a rear end elevation of the truck of FIG. 1 showing details of an earlier embodiment of the rear suspension and partly illustrating the truck body construction.
Figure 4:
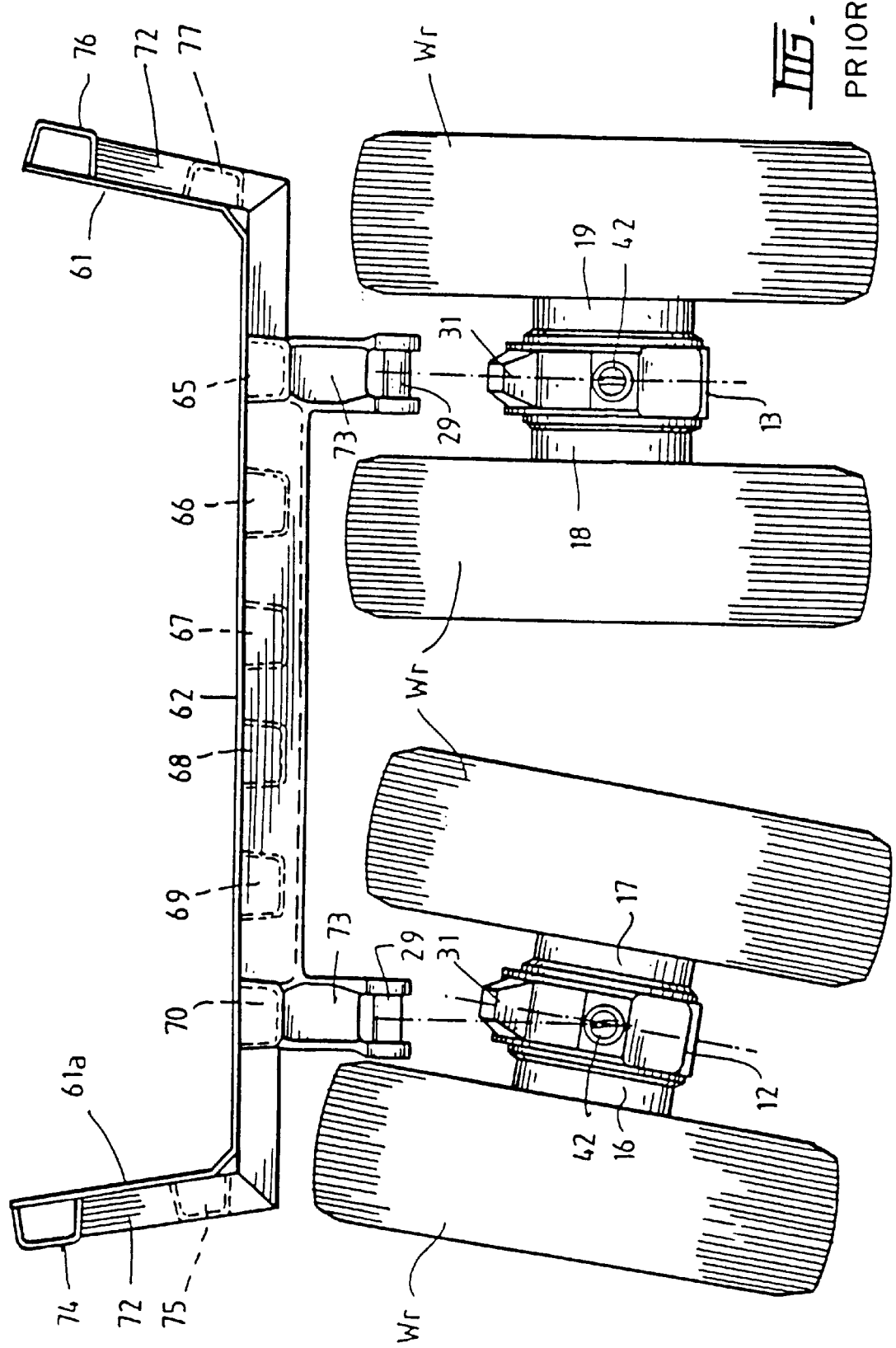
FIG. 4 is a fragmentary sectional end elevation with parts removed to show the extent of transverse rotation of one of the two rear wheel mounting hubs in one direction.
Figure 5:
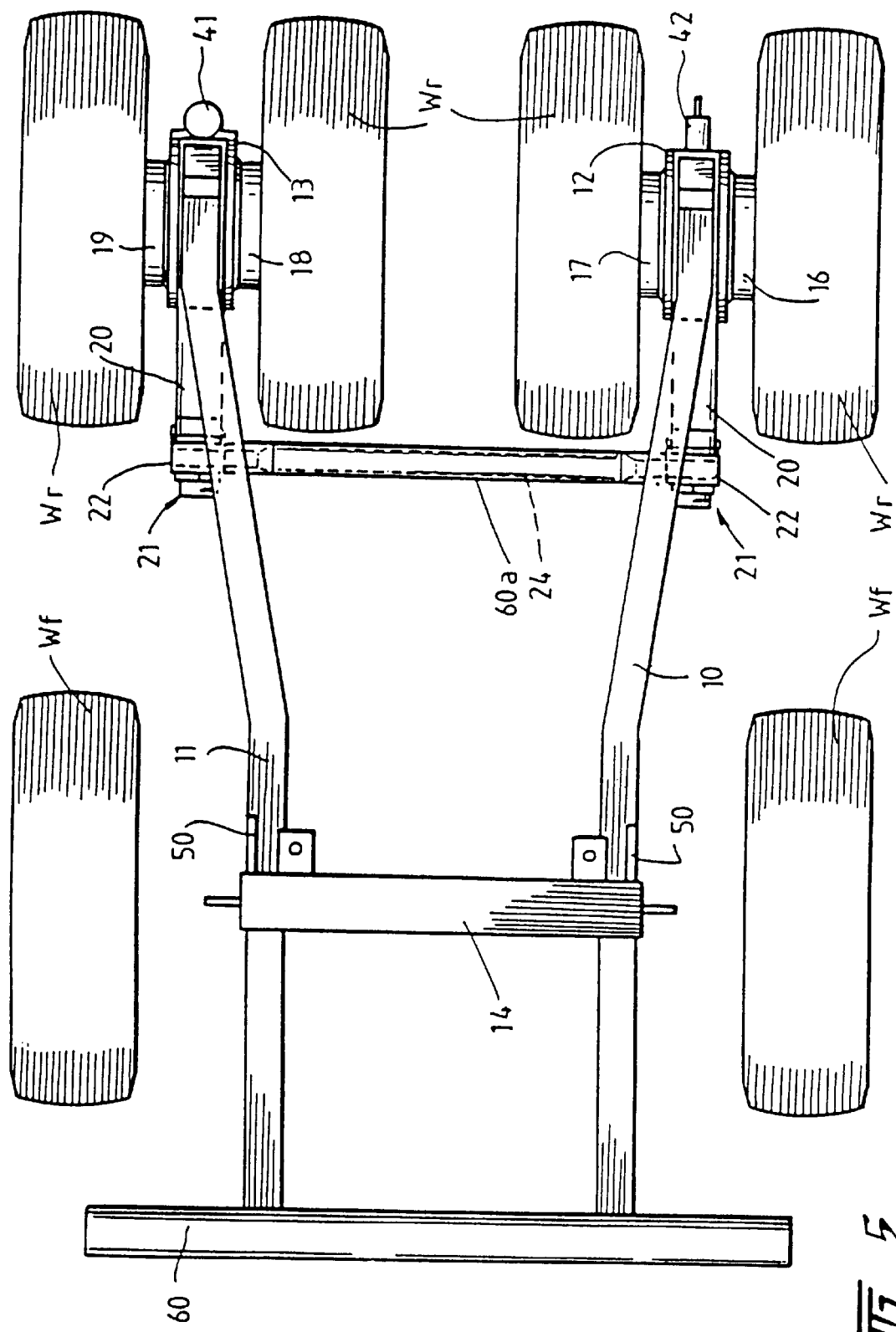
FIG. 5 is a fragmentary plan view of the truck frame with the body removed.
Figure 6:
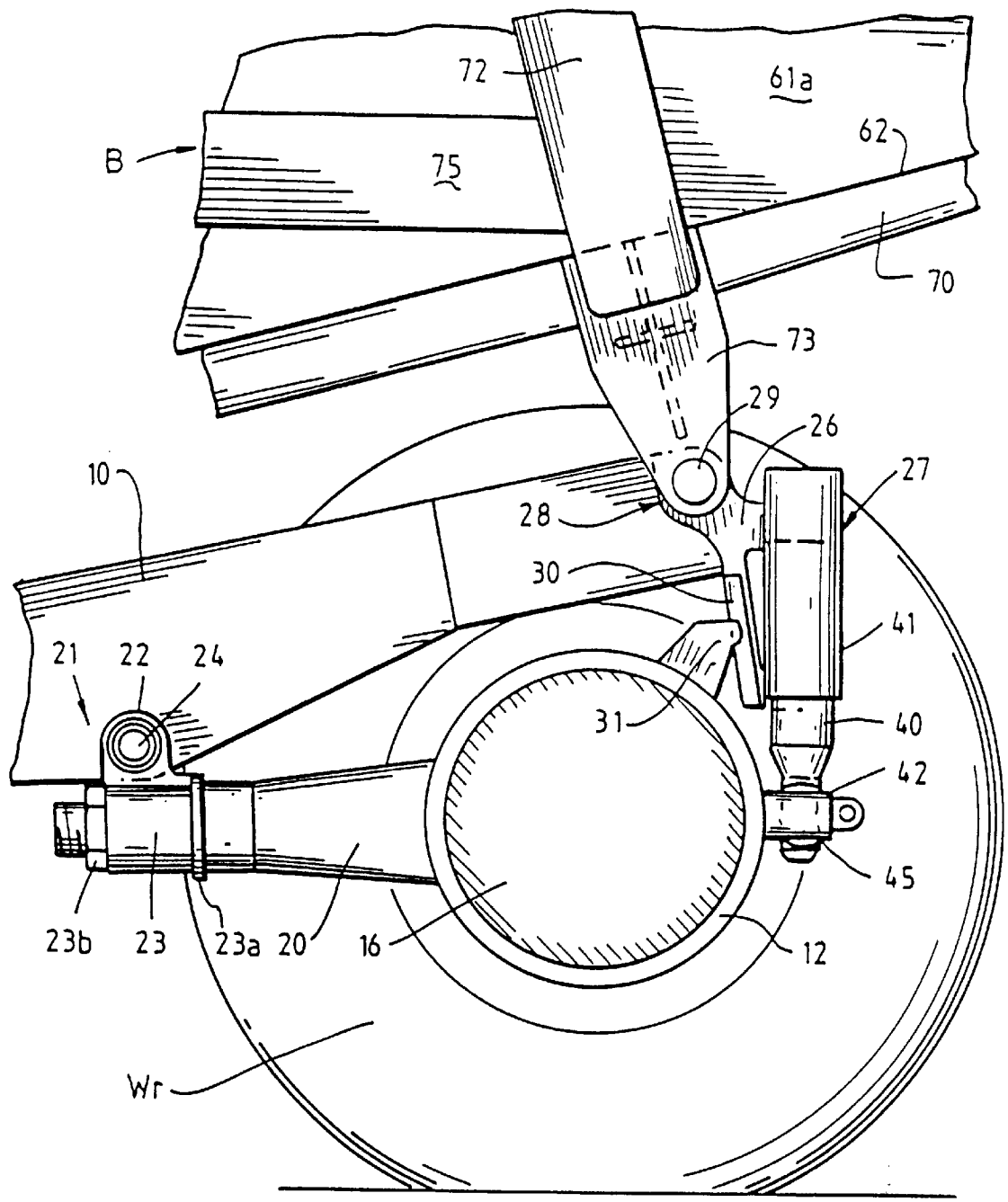
FIG. 6 is an enlarged sectional side elevation of one rear wheel mounting and suspension.
Figure 7:
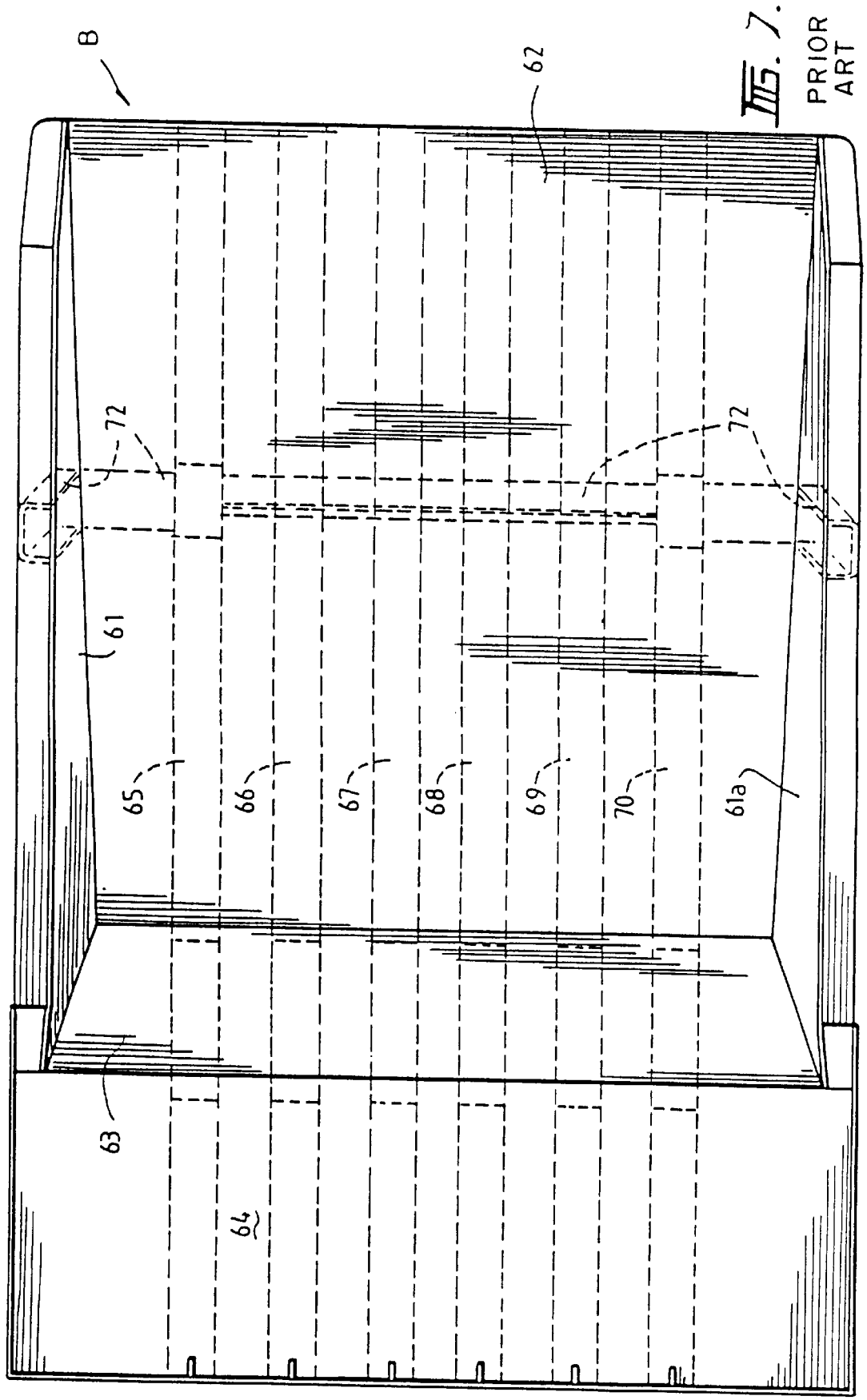
FIG. 7 is a plan view of the truck body showing its construction.

In additional to the above, the floor 62 and the sides 61 and 61a are sloped in the manner shown in FIGS. 1, 3, 4 and 7 of the drawings whereby the width of the floor 62 of the body B increases from the front of the body to the rear of the body, as shown most clearly in FIG. 7 of the drawings. The advantage of this design feature is that wear on the sides of the body is reduced, because when the body is raised to the tipping position as shown in FIG. 2, the load slides into a widening space, rather than being confined to a constant width as for a conventional body design. Furthermore, the weight of the body can be reduced and there is no increase of the overall width of the truck.

As described in U.S. Pat. Nos. 5,385,391 and 5,476,285 referred to above, the body is elevated by a pair of extendible rams 51 carried by mounting points 50 on the frame close to the cross member 14 and at 52 on the truck body B.

It will be appreciated that the truck body features described in greater detail above are equally applicable to trucks of designs other than the design described in greater detail above.

Details of the attachment of the traction motors 16 to 19, the front wheel assemblies, the engine and the construction of the truck ancillaries including the driver's cab have not been included in this specification since each of these items can be of relatively standard construction and is within the existing knowledge of a person of skill in the art. It will, however, be noted that the rear axles are independent short axles with one tire on either side. While the three cross members 14, 60 and 60a provide substantial strength and rigidity between the two main longitudinal members of the main frame, the transverse spacing of the frame members 10 and 11 is also maintained to a significant extent by the direct attachment of the body B to the longitudinal frame members at the pivot brackets 73. This use of the inherent strength of the body B enables a further reduction in the frame strength, weight and cost.

What is claimed is:

1. A very large vehicle, comprising a substantially rigid main frame having a forward section carrying front wheels and a rear section, including spaced frame members each associated with a respective wheel mounting hub, each hub independently supporting a pair of rear wheels, one on either side of the respective hubs a body pivotally mounted on said maintain frame, and a suspension system comprising forward attachment means for each of said hubs pivotally mounted on the respective frame member to allow limited rotation of each of said hubs about a longitudinal axis and a transverse axis relative to the respective frame member, and respective substantially vertically compliant suspension spring units pivotally connected to said hubs to allow relative rotation of said hubs about the longitudinal axis and the transverse axis relative to the respective frame member, said suspension spring units also being pivotally connected to the frame members to control and limit relative rotation of the hubs about the transverse axis relative to the respective frame member and thereby provide a vertically compliant rear wheel supporting system wherein the majority of the restraint to sideways movement of the wheel mounting hubs relative to the spaced frame members is provided by the respective substantially vertically compliant suspension spring units of the suspension system.

2. The vehicle according to claim 1 wherein each of the vertically compliant suspension spring units includes a suspension mounting member which is mounted for pivotal movement on the respective frame member.

3. The vehicle according to claim 2 wherein each of said suspension mounting members is pivotally mounted on the respective frame member in proximity to or coincidental with the pivotal mounting of the body to the main frame.

4. The vehicle according to claim 2 wherein the pivotal mounting of the body to the frame is spaced rearwardly or upwardly from the mounting for each suspension mounting member to the respective frame member.

5. The vehicle according to claim 2 wherein the pivotal connection of each of the suspension spring units to the respective frame member permits rotation of the suspension spring units only about an axis which is parallel to an axis about which the body pivots.

6. The vehicle according to claim 5 wherein the pivotal mount for the body includes cylindrical bearings which engage with the frame members and suspension mounting members.

7. The vehicle according to claim 2 wherein the pivotal connection of each of the suspension spring units to the respective frame member allows limited rotation of the respective hub in a transverse vertical plane relative to the respective frame member.

8. The vehicle according to claim 7 wherein each of the suspension mounting members is provided with a yoke for supporting respective spherical bearing, said spherical bearings engaging bearing surfaces formed in the respective frame member.

9. The vehicle according to claim 8 wherein each of the yokes is provided with a transversely extending bush into which is journalled an inner sleeve for pivotal mounting of the body.

10. The vehicle of claim 2 wherein the pivotal connection of each of the suspension spring units to the respective frame members permits rotation of the suspension spring units about an axis which is parallel to an axis about which the body pivots, the each suspension mounting member being separate from the respective suspension spring unit and secured thereto.

11. The vehicle according to claim 1 wherein the body or frame members include means for constraining rotation of the hubs in a transverse-vertical plane relative to the respective frame members.

12. The vehicle according to claim 1 wherein the forward attachment means comprises mounting arms, mounted on mounting means extending laterally outwardly from said frame members, the mounting means allowing pivotal movement of the mounting arms about the transverse axis and the longitudinal axis relative to said frame members.

13. A large vehicle comprising a substantially rigid main frame having a forward section carrying front wheels and a rear section, said rear section including spaced frame members, each associated with a respective wheel mounting hub, each hub independently supporting a pair of rear wheels, one on either side of the respective hub, a suspension system including a forward attachment means for each of said hubs pivotally mounted to the respective frame member to allow limited rotation about a longitudinal axis and a transverse axis relative to the respective frame member and respective vertically compliant suspension spring units, a substantially rigid load supporting body, and means for pivotally mounting said body with respect to said main frame in proximity to pivotal connections of the suspension spring units to said main frame, each of said vertically compliant suspension spring units being pivotally attached to a respective one of the hubs to allow limited relative rotation of said hubs about the longitudinal axis and the transverse axis relative to said respective frame member, and being pivotally connected to the respective frame member to control and limit relative rotation of said hubs about the transverse axis relative to the respective frame member and thereby provide a vertically compliant rear wheel supporting system wherein the majority of the restraint to sideways movement of the wheel mounting hubs relative to the spaced frame members is provided by the respective substantially vertically compliant suspension spring units.

14. The large vehicle in accordance with claim 13, wherein the forward attachment means comprises mounting arms mounted on mounting means extending laterally outwardly from said frame members, the mounting means allowing pivotal movement of the mounting arms about the transverse axis and the longitudinal axis relative to said frame members.

15. The large vehicle according to claim 13, wherein each of the suspension spring units includes a suspension mounting member mounted for pivotal movement on the respective frame member.

16. The large vehicle according to claim 15, wherein the mounting for each suspension mounting member is in proximity to or coincidental with the pivotal mounting of the body to the main frame.

17. The large vehicle according to claim 16, wherein the pivotal connections of the suspension spring units to the frame members only permit rotation of said suspension spring units about an axis which is parallel to an axis about which the body pivots.

18. The large vehicle according to claim 17, wherein the pivotal mounting of the body includes cylindrical bearings which engage with the frame members and the suspension mounting members of the suspension spring units.

19. The large vehicle according to claim 15, wherein the pivotal mounting of said body to said main frame is spaced rearwardly or upwardly from the pivotal mounting of each suspension mounting member to the respective frame member.

20. The large vehicle according to claim 15, wherein the pivotal connection of each of the suspension spring units to the respective frame member allows limited rotation of the respective hub in a transverse vertical plane relative to the respective frame member.

21. The large vehicle according to claim 20, wherein each of the suspension mounting members of the suspension spring units is provided with a yoke for supporting a respective spherical bearing, said spherical bearings engaging bearing surfaces formed in the respective frame member.

22. The large vehicle according to claim 21, wherein each of the yokes is provided with a transversely extending bush into which is journalled an inner sleeve for pivotal mounting of the load supporting body.

23. The large vehicle according to claim 13 wherein the body or frame members include means for constraining rotation of the hubs in a transverse-vertical plane relative to the respective frame members.

24. A very large vehicle, comprising a substantially rigid main frame having a forward section carrying front wheels and a rear section including spaced frame members each associated with a respective wheel mounting hub, each hub independently supporting a pair of rear wheels, one on either side of the respective hub, a body pivotally mounted on said main frame, and a suspension system comprising forward attachment means for each of said hubs pivotally mounted on the respective frame member to allow limited rotation of each of said hubs about a longitudinal axis and a transverse axis relative to the respective frame member, and respective substantially vertically compliant suspension means pivotally connected to said hubs to allow relative rotation of said hubs about the longitudinal axis and the transverse axis relative to the respective frame member, said suspension means also being pivotally connected to the frame members to control and limit relative rotation of the hubs about the transverse axis relative to the respective frame member, each of the vertically compliant suspension means including a suspension mounting member which is mounted for pivotal movement on the respective frame member, the pivotal connection of each of the suspension means to the respective frame member permitting rotation of the suspension means only about an axis which is parallel to an axis about which the body pivots, thereby providing a vertically compliant rear wheel supporting system wherein the majority of the restraint to sideways movement of the wheel mounting hubs relative to the spaced frame members is provided by the respective substantially vertically compliant suspension means of the suspension system.

25. The vehicle according to claim 24 wherein the pivotal mount for the body includes cylindrical bearings which engage with the frame members and suspension mounting members.

26. A very large vehicle, comprising a substantially rigid main frame having a forward section carrying front wheels and a rear section including spaced frame members each associated with a respective wheel mounting hub, each hub independently supporting a pair of rear wheels, one on either side of the respective hub, a body pivotally mounted on said main frame, and a suspension system comprising forward attachment means for each of said hubs pivotally mounted on the respective frame member to allow limited rotation of each of said hubs about a longitudinal axis and a transverse axis relative to the respective frame member, and respective substantially vertically compliant suspension means pivotally connected to said hubs to allow relative rotation of said hubs about the longitudinal axis and the transverse axis relative to the respective frame member, said suspension means also being pivotally connected to the frame members to control and limit relative rotation of the hubs about the transverse axis relative to the respective frame member, each of the vertically compliant suspension means including a suspension mounting member which is mounted for pivotal movement on the respective frame member, the pivotal connection of the suspension means to the respective frame member allowing limited rotation of the respective hub in the transverse vertical plane relative to the respective frame member, each of the suspension mounting members being provided with a yoke for supporting a respective spherical bearings said spherical bearings engaging bearing surfaces formed in the respective frame member, thereby providing a vertically compliant rear wheel supporting system wherein the majority of the restraint to sideways movement of the wheel mounting hubs relative to the spaced frame members is provided by the respective substantially vertically compliant suspension means of the suspension system.

27. The vehicle according to claim 26 wherein each of the yokes is provided with a transversely extending bush into which is journalled an inner sleeve for pivotal mounting of the body.

28. A large vehicle comprising a substantially rigid main frame having a forward section carrying front wheels and a rear section, said rear section including spaced frame members, each associated with a respective wheel mounting hub, each hub independently supporting a pair of rear wheels, one on either side of the respective hub, a suspension system including a forward attachment means for each of said hubs pivotally mounted to the respective frame member to allow limited rotation about a longitudinal axis and a transverse axis relative to the respective frame member and respective vertically compliant suspension means, a substantially rigid load supporting body, and means for pivotally mounting said body with respect to said main frame in proximity to pivotal connections of the suspension means to said main frame, each of said vertically compliant suspension means being pivotally attached to a respective one of the hubs to allow limited relative rotation of said hubs about the longitudinal axis and the transverse axis relative to said respective frame member, and being pivotally connected to the respective frame member to control and limit relative rotation of said hubs about the transverse axis relative to the respective frame member, each of the suspension means includes a suspension mounting member mounted for pivotal movement on the respective frame member in proximity to or coincidental with the pivotal mounting of the body to the main frame, the pivotal connections of the suspension means to the frame members only permitting rotation of said suspension means about an axis which is parallel to an axis about which the body pivots, thereby providing a vertically compliant rear wheel supporting system wherein the majority of the restraint to sideways movement of the wheel mounting hubs relative to the spaced frame members is provided by the respective substantially vertically compliant suspension means.

29. The large vehicle according to claim 28, wherein the pivotal mounting of the body includes cylindrical bearings which engage with the frame members and the suspension mounting members of the suspension means.

30. A large vehicle comprising a substantially rigid main frame having a forward section carrying front wheels and a rear section, said rear section including spaced frame members, each associated with a respective wheel mounting hub, each hub independently supporting a pair of rear wheels, one on either side of the respective hub, a suspension system including a forward attachment means for each of said hubs pivotally mounted to the respective frame member to allow limited rotation about a longitudinal axis and a transverse axis relative to the respective frame member and respective vertically compliant suspension means, a substantially rigid load supporting body, and means for pivotally mounting said body with respect to said main frame in proximity to pivotal connections of the suspension means to said main frame, each of said vertically compliant suspension means being pivotally attached to a respective one of the hubs to allow limited relative rotation of said hubs about the longitudinal axis and the transverse axis relative to said respective frame member, and being pivotally connected to the respective frame member to control and limit relative rotation of said hubs about the transverse axis relative to the respective frame member, each of the suspension means includes a suspension mounting member mounted for pivotal movement on the respective frame member, the pivotal connection of each of the suspension means to the respective frame member allowing limited rotation of the respective hub in a transverse vertical plane relative to the respective frame member, each of the suspension mounting members of the suspension means being provided with a yoke for supporting a respective spherical bearing, said spherical bearings engaging bearing surfaces formed in the respective frame member, and thereby providing a vertically compliant rear wheel supporting system wherein the majority of the restraint to sideways movement of the wheel mounting hubs relative to the spaced frame members is provided by the respective substantially vertically compliant suspension means.

31. The large vehicle according to claim 30, wherein each of the yokes is provided with a transversely extending bush into which is journalled an inner sleeve for pivotal mounting of the load supporting body.

* * * * *